(12) United States Patent
Wang et al.

(10) Patent No.: US 8,337,195 B1
(45) Date of Patent: Dec. 25, 2012

(54) INJECTION MOLD

(75) Inventors: Xian-Yun Wang, New Taipei (TW);
Xiao-Ping Wu, New Taipei (TW);
Kun-Hsueh Chiang, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 68 days.

(21) Appl. No.: 13/161,499

(22) Filed: Jun. 16, 2011

(51) Int. Cl.
*B29C 45/44* (2006.01)
(52) U.S. Cl. .. 425/556; 264/334; 264/336; 425/DIG. 58
(58) Field of Classification Search .................. 264/334, 264/336; 425/556, DIG. 58
See application file for complete search history.

(56) References Cited

U.S. PATENT DOCUMENTS

| | | | | |
|---|---|---|---|---|
| 4,889,480 | A | * | 12/1989 | Nakamura et al. ............ 425/577 |
| 6,116,891 | A | * | 9/2000 | Starkey ........................ 425/556 |
| 6,521,165 | B2 | * | 2/2003 | Rick ............................ 264/334 |
| 8,142,185 | B1 | * | 3/2012 | Li et al. ....................... 425/556 |

* cited by examiner

*Primary Examiner* — Tim Heitbrink
(74) *Attorney, Agent, or Firm* — Lin & Associates IP, Inc.

(57) ABSTRACT

An injection mold for molding a product which has a gap and an inserting groove at a side thereof includes a movable mold and a stationary mold. A fillister is designed in an inner sidewall of the inserting groove. The stationary mold includes an inclined pillar slantwise mounted in the stationary mold. The movable mold includes a movable core and a sliding mechanism which includes a sliding block, a preventing board and a sliding element. The preventing board is further inserted in the sliding block therein. The sliding block is parted from the product to form the gap, for assisting the sliding element to be parted from the product to form the inserting groove and the fillister under the drive of the inclined pillar and the inner end face of the sliding block acting on the other end of the sliding element, when the injection mold is opened.

4 Claims, 5 Drawing Sheets

INJECTION MOLD

BACKGROUND OF THE INVENTION

1. Field of the Invention

The present invention generally relates to an injection mold, and more particularly to an injection mold capable of ejecting a product out effectively.

2. The Related Art

An injection mold is an important technical equipment for molding various plastic products. With the fast development of plastic industry, the plastic products are widely used in the aviation field, the spaceflight field, the electronic field, the mechanical field, the shipping field and the industrial field. So a variety of complex plastic products are needed to be molded by the injection mold.

A conventional injection mold for molding a product includes a stationary mold, a movable mold, a movable core mounted in a substantial middle of the movable mold and a sliding block movably mounted on the movable mold. A side of the product defines a gap and an inserting groove spaced from the gap. An upper inner sidewall of the inserting groove is concaved upward to form a fillister. When the injection mold is closed, a shaping cavity for molding the product is formed among the stationary mold, the movable core and the sliding block. When the injection mold is opened, the sliding block is driven to slide sideward to be parted from the product directly by an auxiliary jig so as to form the gap, the inserting groove and the fillister simultaneously. However, the fillister of the product is apt to be damaged on account of being formed together with the gap of the product by means of the sliding block being parted from the product directly by the auxiliary jig. Moreover, the usage of the auxiliary jig increases the manufacturing cost of the product.

SUMMARY OF THE INVENTION

An object of the present invention is to provide an injection mold for molding a product which has a gap and an inserting groove located at a side thereof and spaced from each other. A fillister is designed in an inner sidewall of the inserting groove. The injection mold includes a stationary mold and a movable mold. The stationary mold includes an inclined pillar slantwise mounted in the stationary mold with a bottom end thereof stretching under the stationary mold. The movable mold is positioned under the stationary mold when the injection mold is closed. The movable mold includes a movable core and a sliding mechanism. The movable core is mounted on a top of the movable mold and has a top surface thereof spaced from a bottom of the stationary mold to define a shaping cavity together for molding the product. The sliding mechanism includes a sliding block, a preventing board and a sliding element having a protrusion protruded upward from a top of one end thereof. The sliding block is slidably disposed on the movable mold and defines an inserting perforation extending slantwise for receiving the bottom end of the inclined pillar therein so as to drive the sliding block to slide towards the movable core in process of closing the injection mold until the sliding block abutting against the movable core. The sliding block defines an inserting hole and an accommodating space connected with each other to penetrate through the sliding block along the slide direction of the sliding block. A shaping block is protruded at one end surface of the sliding block and is stretched into the shaping cavity. The sliding block further defines an inserting slot for receiving the preventing board therein. The one end of the sliding element with the protrusion together successively passes through the accommodating space and the inserting hole to project into the shaping cavity, with the other end of the sliding element resisting against the preventing board. The other end of the sliding element is movably restrained between the preventing board and an inner end face of the accommodating space connected with the inserting hole, so as to achieve a buffering area between the sliding block and the movable core after the shaping block is parted from the product to form the gap, for assisting the one end of the sliding element with the protrusion together to be parted from the product to form the inserting groove and the fillister under the drive of the inclined pillar and the inner end face of the sliding block acting on the other end of the sliding element, when the injection mold is opened.

As described above, when the sliding element is against the inner end face of the accommodating space, the sliding block is driven to go on sliding away from the movable core under the action of the continuous upward movement of the stationary mold, so as to drive the sliding element to move together with the sliding block to make the free end of the second section drawn out from the product. In the meanwhile, the protrusion of the sliding element can be pulled out from the fillister of the product directly and completely without any deformation. So, it effectively assures a production of the product, and further improves manufacturing efficiency of the product.

BRIEF DESCRIPTION OF THE DRAWINGS

The present invention will be apparent to those skilled in the art by reading the following description, with reference to the attached drawings, in which.

DETAILED DESCRIPTION OF THE EMBODIMENT

Figure 1:
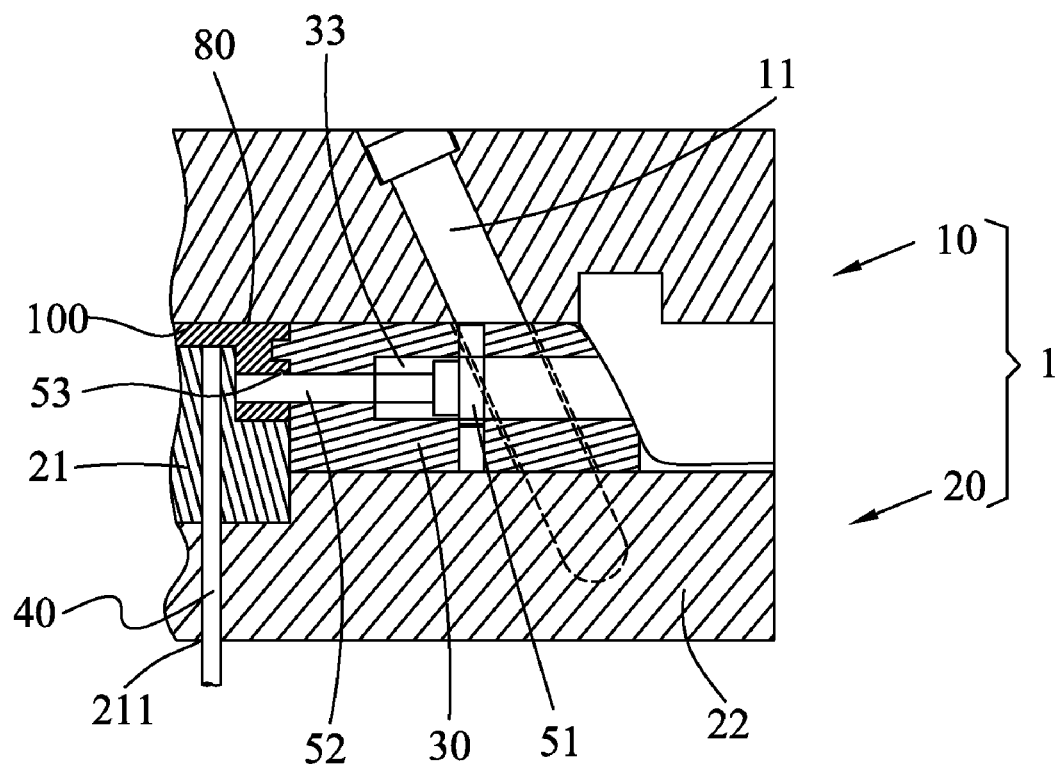
FIG. 1 is a cross-sectional view of an injection mold according to the present invention, wherein the injection mold is closed with a first section of a sliding element resisting against a preventing board of a sliding mechanism, and a product being molded therein.
Figure 4:
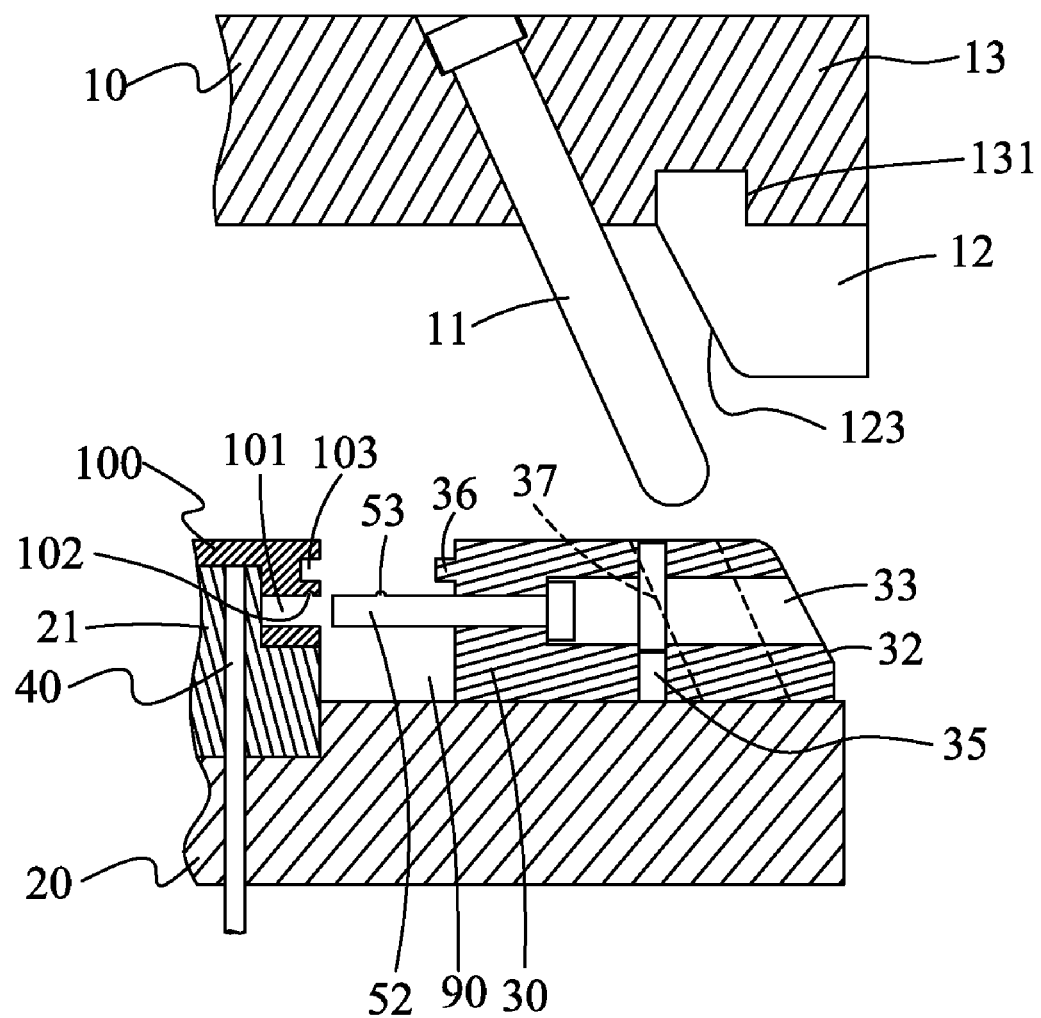
FIG. 4 is a cross-sectional view of the injection mold of FIG. 3, wherein the injection mold is further opened with the protrusion of the sliding element of the sliding mechanism being parted from the product to form a fillister in the product.

Referring to FIG. 1 and FIG. 4, an embodiment of an injection mold 1 according to the present invention is shown. The injection mold 1 adapted for molding a product 100 includes a stationary mold 10 and a movable mold 20.

Figure 2:
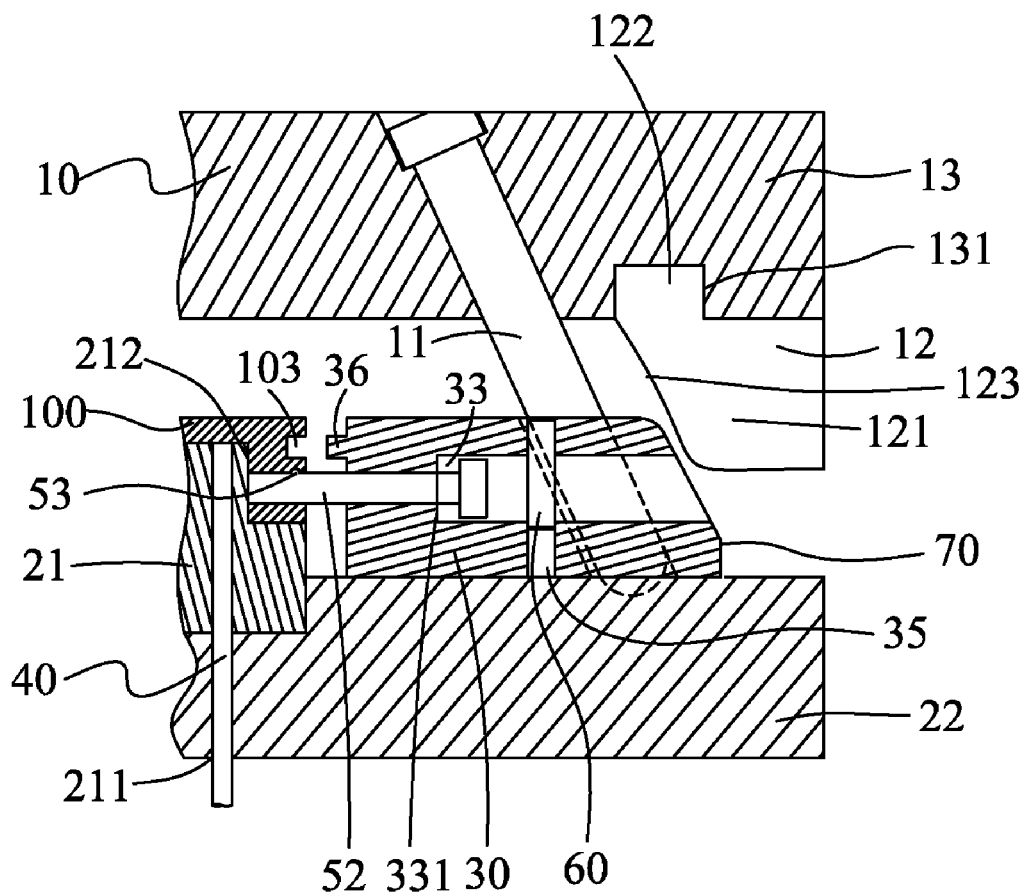
FIG. 2 is a cross-sectional view of the injection mold of FIG. 1, wherein the injection mold is opened with a shaping block of the sliding mechanism being parted from the product to form a gap in one side of the product.

Referring to FIGS. 1-2, the stationary mold 10 includes a stationary mold plate 13, an inclined pillar 11 and a preventing block 12. One end of a bottom of the stationary mold plate 13 is concaved upward to form a fixing groove 131. The preventing block 12 has a base portion 121 and a fixing portion 122 protruding from a top of the base portion 121. A side surface of the base portion 121 is designed with an inclined abutting surface 123. The fixing portion 122 is inserted in the fixing groove 131 to fasten the preventing block 12 to the bottom of the stationary mold plate 13 with the other side surface of the base portion 121 of the preventing block 12 being in alignment with a corresponding end surface of the stationary mold plate 13. The inclined pillar 11 is slantwise mounted in the stationary mold plate 13, with a lower portion thereof stretching under the stationary mold plate 13 and spaced from the base portion 121 of the preventing block 12. The inclined abutting surface 123 of the preventing block 12 faces to the lower portion of the inclined pillar 11 and is inclined along a direction substantially corresponding to the inclined direction of the inclined pillar 11. The stationary mold 10 defines a sprue channel (not shown).

Referring to FIG. 1, FIG. 2, FIG. 3 and FIG. 5, the movable mold 20 includes a movable mold plate 22, a movable core 21 mounted in a middle of a top of the movable mold plate 22, an ejector pin 40 and a sliding mechanism 30 slidably mounted on one side of the top of the movable mold plate 22. A corner of a top of the movable core 21 is cut off to define an opening 212. The sliding mechanism 30 includes a sliding block 70, a preventing board 60 and a substantial lying-T shaped sliding element 50 from a front view. The sliding element 50 includes a first section 51 disposed vertically and a second section 52 levelly and perpendicularly connected with a middle of the first section 51. A top of one end of the second section 52 far away from the first section 51 is protruded upward to form a hemicycle protrusion 53. A top of one end surface of the sliding block 70 protrudes towards the movable core 21 to form a shaping block 36. The other end surface of the sliding block 70 far away from the movable core 21 is designed with a mating surface 32 matching with the abutting surface 123. A substantial middle of the mating surface 32 defines an accommodating space 33 levelly extending towards the opening 212 of the movable core 21 and into the sliding block 70. The end surface of the sliding block 70 opposite to the mating surface 32 defines an inserting hole 34 connecting with a middle of an inner end face 331 of the accommodating space 33 far away from the mating surface 32. The sliding block 70 defines an inserting perforation 37 extending slantwise to penetrate through a top and a bottom thereof, and an inserting slot 35 vertically penetrating therethrough and passing through the accommodating space 33.

Figure 5:
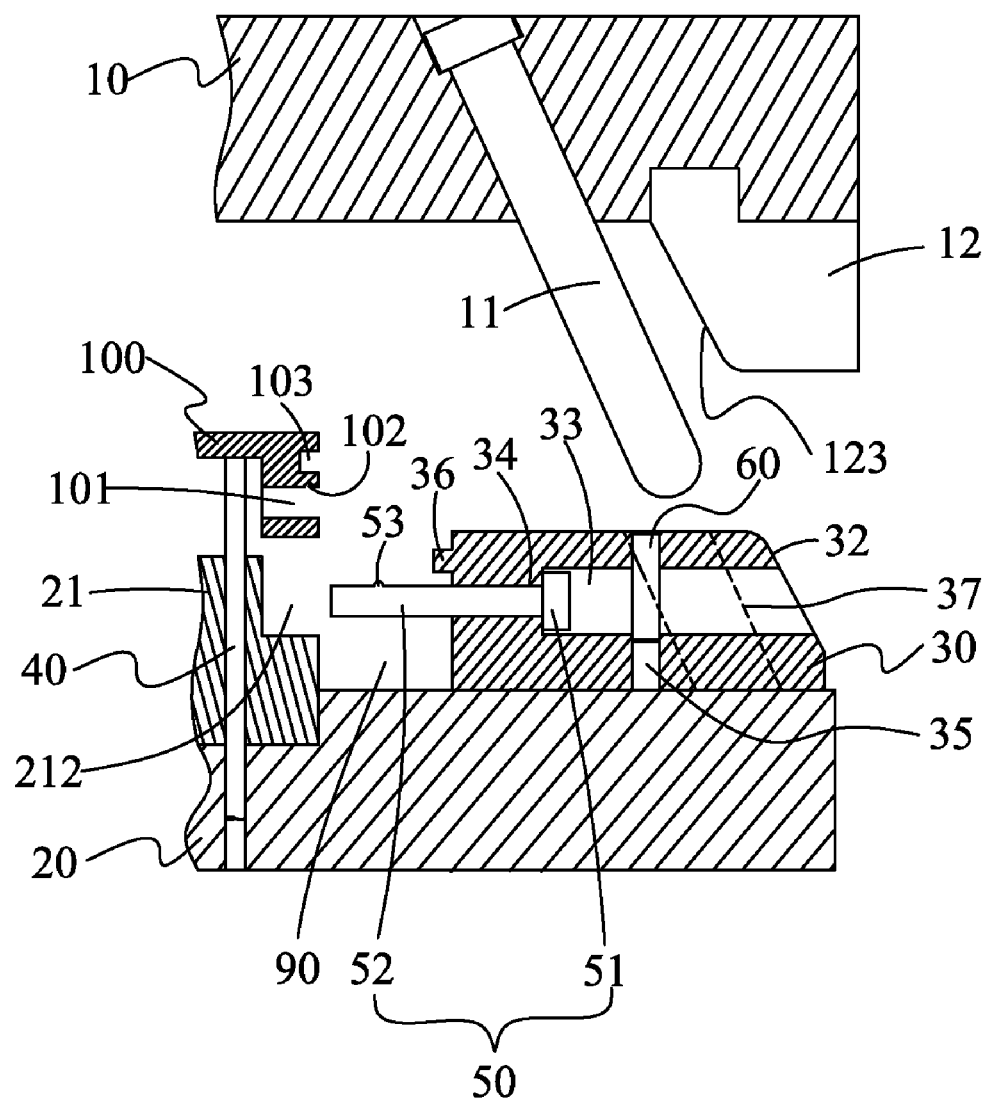
FIG. 5 is a cross-sectional view of the injection mold of FIG. 4, wherein the injection mold is further opened to make the product ejected out therefrom.

Referring to FIG. 1, FIG. 2 and FIG. 5, the second section 52 of the sliding element 50 is movably inserted in the inserting hole 34 through the accommodating space 33, with a free end thereof projected out of the inserting hole 34. The first section 51 of the sliding element 50 is movably located in the accommodating space 33 and between the inner end face 331 and the inserting slot 35. The inclined pillar 11 is movably inserted into the inserting perforation 37 so as to drive the sliding block 70 to slide towards and away from the movable core 21 during the injection mold 1 being closed and opened along the top of the movable mold plate 22. The preventing board 60 is inserted in the inserting slot 35 to prevent the sliding element 50 sliding out from the accommodating space 33. The movable core 21 defines an ejector pin hole 211 vertically penetrating through the movable core 21 and the movable mold plate 22. The ejector pin 40 is movably inserted in the ejector pin hole 211.

Figure 3:
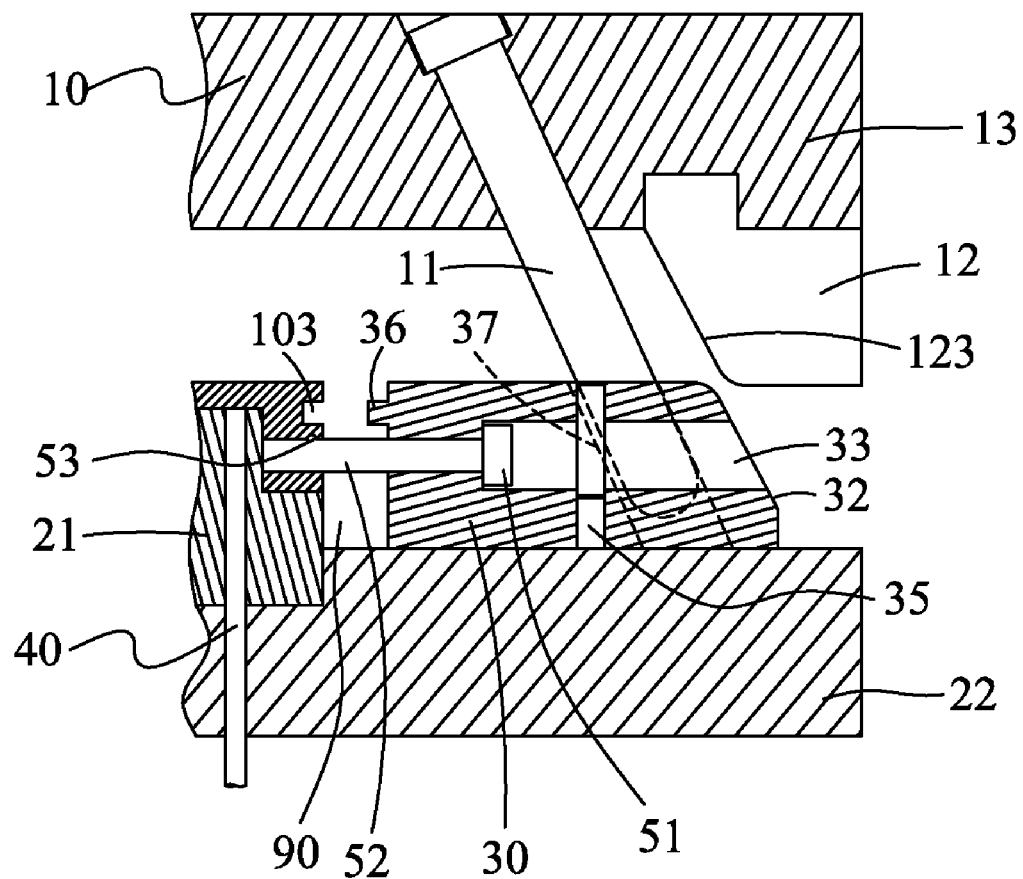
FIG. 3 is a cross-sectional view of the injection mold of FIG. 2, wherein the injection mold is further opened with the first section of the sliding element resisting against an inner end face of the accommodating space, and a protrusion of the sliding element having no movement with respect to the product.

Referring to FIGS. 1-3, when the injection mold 1 is closed, the movable mold 20 moves upward to make the lower portion of the inclined pillar 11 inserted into the inserting perforation 37 of the sliding block 70 so as to drive the sliding block 70 to slide towards the movable core 21 until the bottom of the stationary mold plate 13 is against the top of the sliding block 70 with the inclined abutting surface 123 abutting against the mating surface 32. At this time, the free end of the second section 52 with the protrusion 53 thereon resists against an inner sidewall of the opening 212, the end surface of the sliding block 70 opposite to the mating surface 32 abuts against the movable core 21 to block an opened side of the opening 212, and the first section 51 resists against the preventing board 60 for blocking the sliding element 50 overly moving away from the movable core 21. The ejector pin 40 has a top end thereof in alignment with a top surface of the movable core 21. The top surface of the movable core 21 is spaced from the bottom of the stationary mold plate 13 of the stationary mold 10. A shaping cavity 80 is formed among the top surface of the movable core 21, a bottom wall of the opening 212, the bottom of the stationary mold plate 13 and the sliding block 70. The shaping block 36 is projected in the shaping cavity 80. Then thermoplastic resin is injected into the shaping cavity 80 of the injection mold 1 through the sprue channel. The thermoplastic resin is solidified for a predetermined time to form the product 100 which has a gap 103 at an upper portion of a side thereof, and an inserting groove 101 at a lower portion of the side thereof and spaced from the gap 103. A top inner sidewall of the inserting groove 101 is provided with a fillister 102 thereon.

Referring to FIGS. 1-5, when the injection mold 1 is opened, the movable mold 20 moves upward to drive the sliding block 70 to slide away from the movable core 21 under the action of the inclined pillar 11 and along the abutting surface 123, to make the shaping block 36 of the sliding block 70 parted from the product 100 so as to form the gap 103 at the upper portion of the side of the product 100. When the first section 51 of the sliding element 50 is against the inner end face 331 of the accommodating space 33, the shaping block 36 of the sliding block 70 is parted from the gap 103 of the product 100 completely and a buffering area 90 is formed between the end surface of the sliding block 70 opposite to the mating surface 32 and the movable core 21. Then the movable mold 20 keeps on moving upward to drive the sliding block 70 to go on sliding away from the movable core 21 so as to drive the sliding element 50 to move together with the sliding block 70. So, the free end of the second section 52 and the protrusion 53 of the sliding element 50 can be drawn out from the product 100 to form the inserting groove 101 at the lower portion of the side of the product 100 and the fillister 102 in the top inner sidewall of the inserting groove 101. At last, the product 100 can be ejected upward out of the movable mold 20 directly by the ejector pin 40.

As described above, when the first section 51 is against the inner end face 331 of the accommodating space 33, the sliding block 70 is driven to go on sliding away from the movable core 21 under the action of the continuous upward movement of the stationary mold 10, so as to drive the sliding element 50 to move together with the sliding block 70 to make the free end of the second section 52 drawn out from the product 100. In the meanwhile, the protrusion 53 of the sliding element 50 can be pulled out from the fillister 102 of the product 100 directly and completely without any deformation. So, it effectively assures a production of the product 100, and further improves manufacturing efficiency of the product 100.

What is claimed is:

1. An injection mold for molding a product which has a gap and an inserting groove located at a side thereof and spaced from each other, a fillister being designed in an inner sidewall of the inserting groove, the injection mold comprising:

a stationary mold including an inclined pillar slantwise mounted in the stationary mold with a bottom end thereof stretching under the stationary mold; and a movable mold positioned under the stationary mold when the injection mold is closed, the movable mold including a movable core mounted on a top of the movable mold and having a top surface thereof spaced from a bottom of the stationary mold to define a shaping cavity together for molding the product, and a sliding mechanism including a sliding block, a preventing board and a sliding element having a protrusion protruded upward from a top of one end thereof, the sliding block being slidably disposed on the movable mold and defining an inserting perforation extending slantwise for receiving the bottom end of the inclined pillar therein so as to drive the sliding block to slide towards the movable core in process of closing the injection mold until the sliding block abutting against the movable core, the sliding block defining an inserting hole and an accommodating space connected with each other to penetrate through the sliding block along the slide direction of the sliding block, a shaping block being protruded at one end surface of the sliding block and stretched into the shaping cavity, the sliding block further defining an inserting slot for receiving the preventing board therein, the one end of the sliding element with the protrusion together successively passing through the accommodating space and the inserting hole to project into the shaping cavity, with the other end of the sliding element resisting against the preventing board, wherein the other end of the sliding element is movably restrained between the preventing board and an inner end face of the accommodating space connected with the inserting hole, so as to achieve a buffering area between the sliding block and the movable core after the shaping block is parted from the product to form the gap, for assisting the one end of the sliding element with the protrusion together to be parted from the product to form the inserting groove and the fillister under the drive of the inclined pillar and the inner end face of the sliding block acting on the other end of the sliding element, when the injection mold is opened.

2. The injection mold as claimed in claim 1, wherein the stationary mold includes a preventing block mounted to a side of the bottom of the stationary mold and spaced from the inclined pillar, a side surface of the preventing block is designed with an inclined abutting surface facing the inclined pillar, the other end surface of the sliding block opposite to the movable core defines a mating surface abutting against the abutting surface when the injection mold is closed, and cooperating with the abutting surface to guide the slide of the sliding block.

3. The injection mold as claimed in claim 1, wherein the shaping cavity includes an opening opened at a corner of a top of the movable core and facing the sliding block, the one end of the sliding element with the protrusion thereon stretches into the opening to resist against an inner sidewall of the opening in the closed state of the injection mold.

4. The injection mold as claimed in claim 1, wherein the movable mold includes an ejector pin vertically penetrating through the movable mold and the movable core for ejecting upward the product out of the movable mold after the shaping block, the one end of the sliding element and the protrusion are parted from the product.

\* \* \* \* \*